(12) United States Patent
Ashley et al.

(10) Patent No.: US 7,797,726 B2
(45) Date of Patent: Sep. 14, 2010

(54) METHOD AND SYSTEM FOR IMPLEMENTING PRIVACY POLICY ENFORCEMENT WITH A PRIVACY PROXY

(75) Inventors: Paul Anthony Ashley, Bardon (AU); Sridhar R. Muppidi, Austin, TX (US); Mark Vandenwauver, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 11/014,561

(22) Filed: Dec. 16, 2004

(65) Prior Publication Data

US 2006/0136985 A1 Jun. 22, 2006

(51) Int. Cl.
H04L 9/34 (2006.01)
G06F 21/00 (2006.01)
H04L 9/32 (2006.01)
(52) U.S. Cl. ............................................. 726/1; 726/30
(58) Field of Classification Search ............. 726/12–13, 726/26–27
See application file for complete search history.

(56) References Cited

U.S. PATENT DOCUMENTS

| | | | |
|---|---|---|---|
| 6,345,289 | B1 | 2/2002 | Lotspiech et al. |
| 6,442,686 | B1 | 8/2002 | McArdle et al. |
| 2001/0011247 | A1 | 8/2001 | O'Flaherty et al. |
| 2001/0037407 | A1 | 11/2001 | Dragulev et al. |
| 2001/0054155 | A1 | 12/2001 | Hagan et al. |
| 2002/0010784 | A1 | 1/2002 | Clayton et al. |
| 2002/0026345 | A1 | 2/2002 | Juels |
| 2002/0104015 | A1 | 8/2002 | Barzilai et al. |
| 2002/0124067 | A1 | 9/2002 | Parupudi et al. |
| 2002/0174073 | A1 | 11/2002 | Nordman et al. |
| 2002/0174236 | A1* | 11/2002 | Mathur et al. ................ 709/229 |
| 2002/0178381 | A1* | 11/2002 | Lee et al. ..................... 713/201 |

(Continued)

FOREIGN PATENT DOCUMENTS

WO WO0145022 6/2001

(Continued)

OTHER PUBLICATIONS

Levy, S., "Improving Understanding of Website Privacy Policies" MSC Thesis, Department of Computer Science, University of Saskatchewan, Canada.

*Primary Examiner*—Gilberto Barron, Jr.
*Assistant Examiner*—Venkat Perungavoor
(74) *Attorney, Agent, or Firm*—Jeffrey S. LaBaw; David H. Judson

(57) ABSTRACT

A method is presented for enforcing a privacy policy concerning management of personally identifiable information in a centralized manner through a privacy proxy agent. A proxy intercepts a message from a first system to a second system, e.g., from a server to a client, and determines whether the message is associated with an operation on personally identifiable information; if not, then the proxy sends the message to the second system, but if so, then the proxy determines whether the operation on the personally identifiable information is compliant with a privacy policy and with user preference information with respect to the privacy policy for a user who is associated the personally identifiable information. If the message is compliant with the privacy policy and user preference data, then the proxy sends the first message to the second system; otherwise, an error indication is returned to the first system.

24 Claims, 6 Drawing Sheets

U.S. PATENT DOCUMENTS

| | | |
|---|---|---|
| 2003/0084300 A1 | 5/2003 | Koike |
| 2003/0088520 A1* | 5/2003 | Bohrer et al. ................. 705/74 |
| 2004/0078593 A1* | 4/2004 | Hind et al. ................. 713/201 |
| 2004/0103310 A1* | 5/2004 | Sobel et al. ................. 713/201 |
| 2004/0125798 A1 | 7/2004 | Hondo |
| 2005/0005170 A1* | 1/2005 | Camenisch et al. ......... 713/201 |
| 2005/0076233 A1* | 4/2005 | Aarts et al. ................. 713/201 |
| 2005/0251865 A1* | 11/2005 | Mont et al. ................... 726/26 |

FOREIGN PATENT DOCUMENTS

WO    WO0203291    1/2002

\* cited by examiner

METHOD AND SYSTEM FOR IMPLEMENTING PRIVACY POLICY ENFORCEMENT WITH A PRIVACY PROXY

CROSS-REFERENCE TO RELATED APPLICATIONS

The present application is related to the following application: application Ser. No. 10/976,266, filed (TBD), entitled "Method and system for implementing privacy notice, consent, and preference with a privacy proxy", which is hereby incorporated by reference.

BACKGROUND OF THE INVENTION

1. Field of the Invention

The present invention relates to an improved data processing system and, in particular, to a method and apparatus for multicomputer data transferring. Still more particularly, the present invention provides a method and apparatus for multicomputer distributed resource management.

2. Description of Related Art

An individual interacts with many enterprises, e.g., institutions, organizations, and corporations, that maintain information about the individual for various purposes. In modern society, this information is maintained electronically, which allows the information to be processed much more efficiently than paper documents. However, concerns about the privacy of electronically managed information have grown with the adoption of Internet-based services, which allows enterprises to share information easily. Privacy has been defined as "the claim of individuals, groups, or institutions to determine for themselves when, how, and to what extent information about them is communicated to others", Westin, *Privacy and Freedom*, 1967.

Due to regulation and consumer concerns, many enterprises are having to re-evaluate their privacy management operations, such as the manner in which they handle personally identifiable information (PII) that they collect about individuals.

As a first step towards managing personally identifiable information, responsible enterprises usually create, implement, and enforce a privacy policy. Before an enterprise collects a user's personally identifiable information, the enterprise should obtain the user's consent to the privacy policy and should collect the user's preferences on any options that the enterprise may provide with respect to the manner in which the enterprise manages the user's personally identifiable information. FIG. 2A depicts a simple diagram showing an exchange of privacy promises 202 from a server 204 to a user 206 in exchange for the user's consent to the privacy promises and a selection of the user's privacy preferences 208.

The privacy policy generally includes a set of promises that an enterprise makes to users of services that are provided by an enterprise. At a low level, these privacy promises can be captured to some degree in a machine-readable format. An example of this is the Platform for Privacy Preferences Project (P3P), which has been developed by the World Wide Web Consortium; P3P has emerged as an industry standard for providing an automated way for users to gain more control over the use of personal information that is collected and managed by web sites which the users visit. P3P provides a mechanism for disclosing the manner in which a site handles personal information about its users; P3P-enabled web sites make this information available in a standard, machine-readable format, and P3P-enabled browsers can use this information automatically by comparing it to a user's previously-selected privacy preferences.

The privacy promises in the privacy policy state, at a high level, how the enterprise manages and possibly disseminates any personally identifiable information. For example, a privacy policy can be in human-readable format, such as text within a web page that includes legal terminology. FIG. 2B shows a graphical user interface window 210 that might appear when a user is perusing a web site; window 210 is a pop-up window that might appear on a user's screen in response to execution of a script that is embedded within a web page document that has been received by the user's browser application on a client device. The intention of window 210 is to provide notice to the user concerning the enterprise's, i.e. the web site operator's, privacy policy and to obtain an acknowledgment from the user that the user has read the privacy policy, e.g., by forcing the user to select check box 212 before the user can continue with an operation within the web site; the selection of hyperlink 214 will present the privacy policy in a human-readable format for the user, possibly by presenting another pop-up window on the user's screen or by directing the web browser to retrieve another web page. Window 210 also collects user preferences concerning some options with respect to the enterprise's privacy policy. Check box 216 gives the user control over an action that the enterprise might perform while using the user's personally identifiable information. Check box 218 gives the user control over whether the enterprise may share some of the user's personally identifiable information with other enterprises. "OK" button 220 closes window 210.

Using a mechanism similar to that shown in FIG. 2B, a user acknowledges the enterprise's privacy policy and indicates their acceptance to the privacy policy. This may also involve the user selecting some personal privacy preferences with respect to the management of the user's personally identifiable information. Once the user has acknowledged the privacy policy and indicated the user's preferences, then the enterprise can collect the user's personally identifiable information.

A user may attempt to access personally identifiable information, whether or not the user is the owner of the information, at some future point in time; in other words, a user may attempt to access a particular person's personally identifiable information after an enterprise has collected a particular person's consent to a privacy policy and that person's preferences with respect to the privacy policy. In general, the owner of any personally identifiable information that has been previously collected can legitimately access the collected information. However, other types of users may attempt to access the collected information; a user may have privileged access to the collected information even though the user is not the owner of the personally identifiable information. For example, specific employees of an enterprise, such as those that work within a human resources department, may be authorized to access the collected information. Even though these users are not the owner's of the personally identifiable information, they may legitimately access the information as long as the information is handled in accordance with the privacy policy as agreed by the owner. Enforcement of a privacy policy includes obeying the privacy policy while also respecting the previously specified preferences of the owner of the information with respect to the privacy policy.

Current enterprise mechanisms for implementing privacy policy enforcement require the implementation of privacy policy enforcement within each application that is provided by the enterprise. For example, an enterprise may operate many applications that access personally identifiable information, and each application is modified to encode rules for applying a privacy policy and for checking a data owner's previously specified consent and preferences. FIG. 2C shows a typical organization of privacy policy management within an enterprise domain 222 that is operating an e-commerce web site in which multiple e-commerce applications 224-228 are individually responsible for enforcing the enterprise's privacy policy for any interactions with the user/client 230 and for individually checking the user's consent and preferences to the privacy policy with database 232.

In some operational scenarios, each e-commerce application that is shown in FIG. 2C may be concerned with different privacy policy issues because they handle different types of personally identifiable information, thereby requiring slightly different operations for handling user consent and user preferences with respect to the different types of personally identifiable information. Hence, the prior art approach that is depicted in FIG. 2C is problematic. Each application that handles personally identifiable information must be modified to include functionality for privacy policy enforcement, which may require multiple changes to different parts of each application. Application development and maintenance costs increase as each application needs to be enhanced to include the privacy functions.

In addition, personally identifiable information is often accessed multiple times within a single enterprise, possibly by different applications accessing different data. Users of the enterprise services may have dissatisfying experiences when navigating enterprise services and confronting different manners for enforcing a privacy policy. Moreover, an enterprise might not be sure that there is a consistent implementation of privacy policy enforcement within all applications. For example, the enterprise may be operating an application that accesses data without providing users with appropriate notice; subsequent discovery and remedy of such situations can greatly increase user dissatisfaction with the enterprise.

Therefore, it would be advantageous to have a method and system for implementing coherent, enterprise-wide, functionality for privacy policy enforcement.

SUMMARY OF THE INVENTION

A method, a system, an apparatus, and a computer program product is presented for enforcing a privacy policy concerning management of personally identifiable information in a centralized manner through a privacy proxy agent. A proxy intercepts a message from a first system to a second system, e.g., from a server to a client, and determines whether the message is associated with an operation on personally identifiable information; if not, then the proxy sends the message to the second system, but if so, then the proxy determines whether the operation on the personally identifiable information is compliant with a privacy policy and with user preference information with respect to the privacy policy for a user who is associated the personally identifiable information. If the message is compliant with the privacy policy and user preference data, then the proxy sends the first message to the second system; otherwise, an error indication is returned to the first system.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
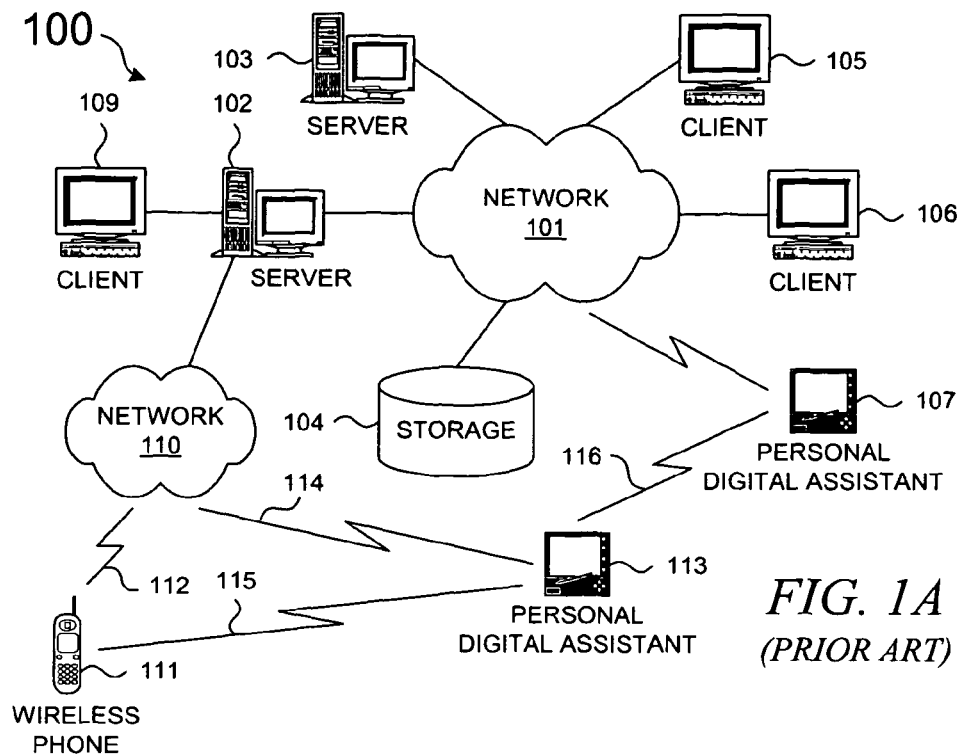
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
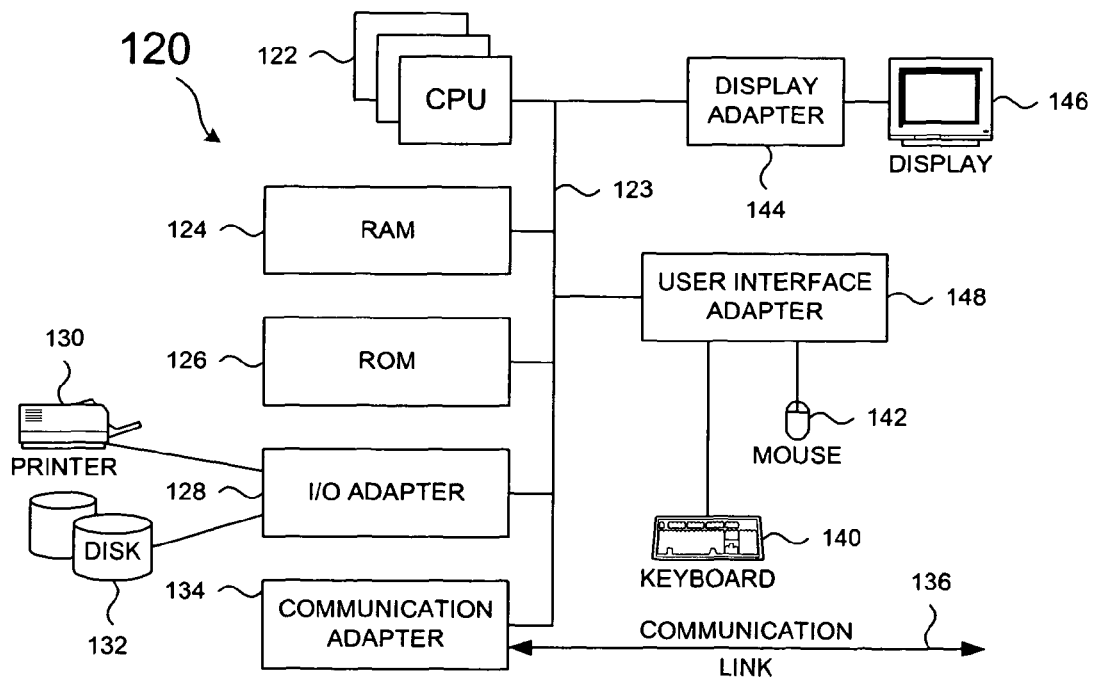
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to an improved data processing environment. Prior to describing the present invention in more detail, a typical distributed data processing environment is described.

The descriptions of the figures herein involve certain actions by either a client device, a user of the client device, or a user agent that is operating on the client device. One of ordinary skill in the art would understand that responses and/or requests to/from the client are sometimes initiated by a user and at other times are initiated automatically by a client or a user agent, often on behalf of a user of the client. Hence, when a client or a user of a client is mentioned in the description of the figures, it should be understood that the terms "client" and "user" can be used interchangeably without significantly affecting the meaning of the described processes.

Figure 1C:
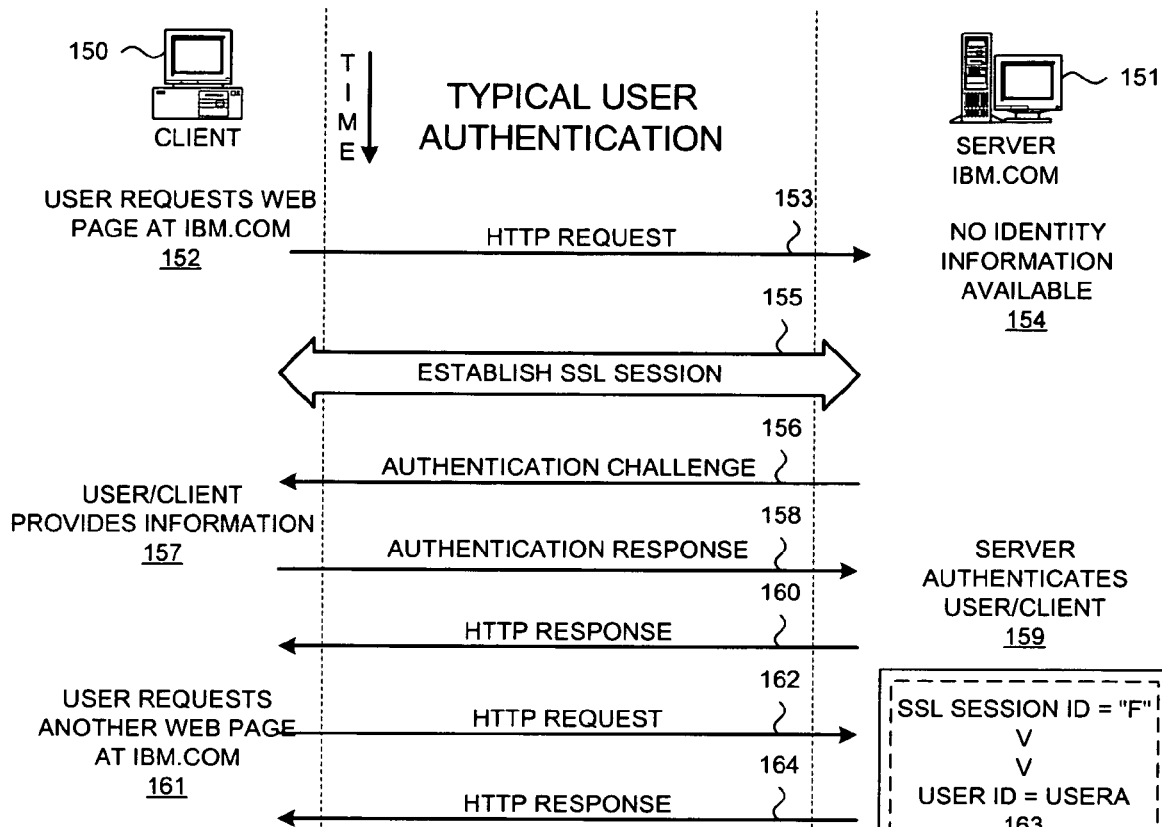
FIG. 1C depicts a data flow diagram that illustrates a typical authentication process that may be used when a client attempts to access a protected resource at a server.

With reference now to FIG. 1C, a data flow diagram illustrates a typical authentication process that may be used when a client attempts to access a protected resource at a server. As illustrated, the user at a client workstation 150 seeks access over a computer network to a protected resource on a server 151 through the user's web browser executing on the client workstation. A protected or controlled resource is a resource (an application, an object, a document, a page, a file, executable code, or other computational resource, communication-type resource, etc.) for which access is controlled or restricted. A protected resource is identified by a Uniform Resource Locator (URL), or more generally, a Uniform Resource Identifier (URI), that can only be accessed by an authenticated and authorized user. The computer network may be the Internet, an intranet, or other network, as shown in FIG. 1A or FIG. 1B, and the server may be a web application server (WAS), a server application, a servlet process, or the like.

The process is initiated when the user requests a server-side protected resource, such as a web page within the domain "ibm.com" (step 152). The terms "server-side" and "client-side" refer to actions or entities at a server or a client, respectively, within a networked environment. The web browser (or associated application or applet) generates an HTTP request (step 153) that is sent to the web server that is hosting the domain "ibm.com". The terms "request" and "response" should be understood to comprise data formatting that is appropriate for the transfer of information that is involved in a particular operation, such as messages, communication protocol information, or other associated information.

The server determines that it does not have an active session for the client (step 154), so the server initiates and completes the establishment of an SSL (Secure Sockets Layer) session between the server and the client (step 155), which entails multiple transfers of information between the client and the server. After an SSL session is established, subsequent communication messages are transferred within the SSL session; any secret information remains secure because of the encrypted communication messages within the SSL session.

However, the server needs to determine the identity of the user before allowing the user to have access to protected resources, so the server requires the user to perform an authentication process by sending the client some type of authentication challenge (step 156). The authentication challenge may be in various formats, such as an HTML form. The user then provides the requested or required information (step 157), such as a username or other type of user identifier along with an associated password or other form of secret information.

The authentication response information is sent to the server (step 158), at which point the server authenticates the user or client (step 159), e.g., by retrieving previously submitted registration information and matching the presented authentication information with the user's stored information. Assuming the authentication is successful, an active session is established for the authenticated user or client.

The server then retrieves the originally requested web page and sends an HTTP response message to the client (step 160), thereby fulfilling the user's original request for the protected resource. At that point, the user may request another page within "ibm.com" (step 161) by clicking a hypertext link within a browser window, and the browser sends another HTTP request message to the server (step 162). At that point, the server recognizes that the user has an active session (step 163), and the server sends the requested web page back to the client in another HTTP response message (step 164).

Figure 1D:
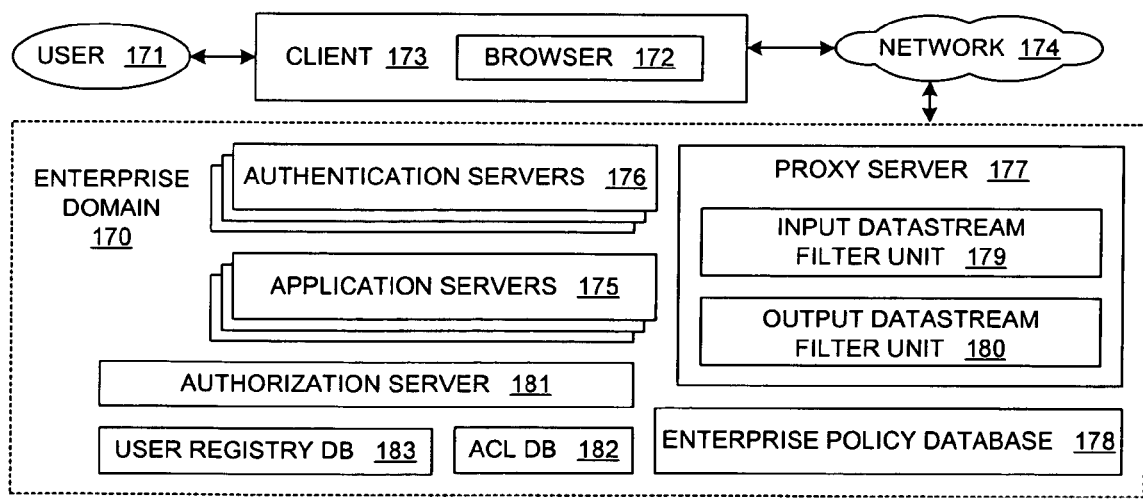
FIG. 1D depicts a block diagram that shows a typical distributed data processing system for an enterprise domain.

With reference now to FIG. 1D, a block diagram depicts a typical distributed data processing system for an enterprise domain. As in a typical corporate computing environment or an Internet-based computing environment, enterprise domain 170 hosts controlled resources that user 171 can access, e.g., by using browser application 172 on client device 173 through network 174. Application servers 175 support accessible resources through web-based applications or other types of applications, including legacy applications. Authentication servers 176 support various authentication mechanisms, such as username/password, X.509 certificates, or secure tokens. Enterprise domain 170 supports multiple servers. Proxy server 177 performs a wide range of functions for enterprise domain 170. Proxy server 177 can be administratively configured through configuration files and enterprise policy database 178 to control the functionality of proxy server 177, e.g., caching web pages in order to mirror the content from an application server or filtering the incoming and outgoing datastreams through input datastream filter unit 179 and output datastream filter unit 180. Input datastream filter unit 179 may perform multiple checks on incoming requests while output datastream filter unit 180 may perform multiple checks on outgoing responses; each check may be performed in accordance with goals and conditions that are specified within various enterprise policies.

Enterprise domain 170 comprises authorization server 181, which might employ information access control list (ACL) database 182. Authorization server 181 determines whether application servers 175 are authorized to access personally identifiable information that is stored within user registry database 183 by checking enterprise policy database 178 and/or ACL database 182 against requests for that data.

The above-noted entities within enterprise domain 170 represent typical entities within many computing environments. As was shown with respect to FIG. 1C, web-based applications can utilize various means to prompt users to enter authentication information, often as a username/password combination within an HTML form. In the example that is shown in FIG. 1D, user 171 may be required to be authenticated before client 173 may have access to resources, after which a session is established for client 173 in a manner similar to that described above in FIG. 1C. In FIG. 1D, after receiving an incoming request from client 173, input datastream filter unit 179 may determine whether client 173 has already established a session; if not, an authentication service on authentication servers 176 can be invoked in order to authenticate user 171. If client 173 has already established a session, then additional checks may be performed on an incoming request prior to granting access to a controlled resource; the additional checks may be specified in an enterprise authentication policy.

As discussed above, many enterprises have implemented privacy management operations to address consumer concerns, such as the manner in which an enterprise handles personally identifiable information (PII) that it collects about individuals. However, enterprises often operate multiple online applications, e.g., possibly many interoperating e-commerce applications on a single web site. Implementing privacy management operations using prior art systems has been problematic. Each application that accesses personally identifiable information must be modified to include functionality for privacy policy enforcement.

One current solution to these problems is to provide a privacy policy server and an application programming interface (API) so that an application can call out when it needs to make a privacy policy enforcement decision, e.g., in a manner that is similar to that which is described above with respect to authorization server 181 that is shown in FIG. 1D. A privacy policy server stores the privacy policy and can make an authorization decision based on the request. Although this technique reduces some application development costs and maintenance costs, the applications still need to be modified at the appropriate points to call out to the privacy policy server. This solution is expensive in application development time, and implementation uncertainty persists because the enterprise is still not sure that the privacy policy has been consistently implemented in all applications.

Turning now to focus on the present invention, it was noted above that there was a need for a method and system for implementing coherent, enterprise-wide, functionality for privacy policy enforcement. The present invention is directed to an improved data processing system that is extended to centralize enforcement of a privacy policy within a privacy proxy that acts on behalf of multiple applications within an enterprise. The present invention is described in more detail below with respect to the remaining figures.

Figure 3A:
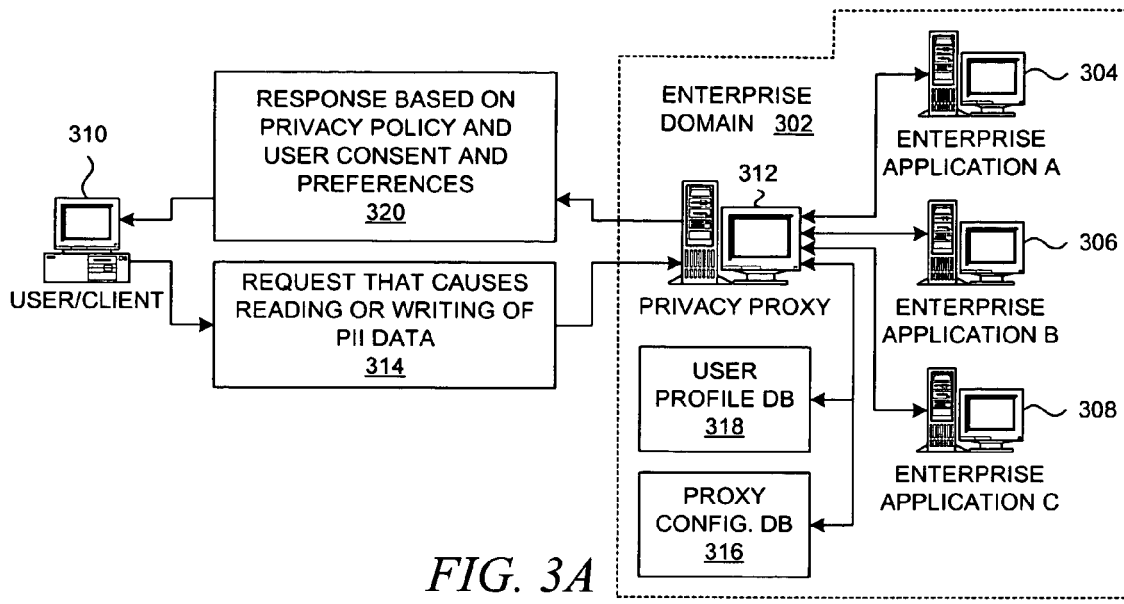
FIG. 3A depicts a block diagram that illustrates a privacy proxy in accordance with an implementation of the present invention.

With reference now to FIG. 3A, a block diagram depicts a privacy proxy in accordance with an implementation of the present invention. Enterprise domain 302 supports multiple applications 304, 306, and 308 in a manner similar to enterprise domain 170 that is shown in FIG. 1D. User/client 310 accesses resources that are supported within enterprise domain 302; additional authentication servers, etc., may be implemented within enterprise domain 302 but are not shown in FIG. 3A.

Figure 2A:
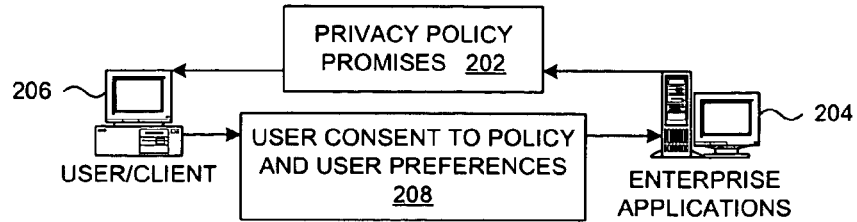
FIG. 2A depicts a block diagram that shows a typical process in which an enterprise domain provides privacy promises to a user and subsequently receives the user's consent to a privacy policy along with the user's preferences concerning the management of the user's personally identifiable information.
Figure 2B:
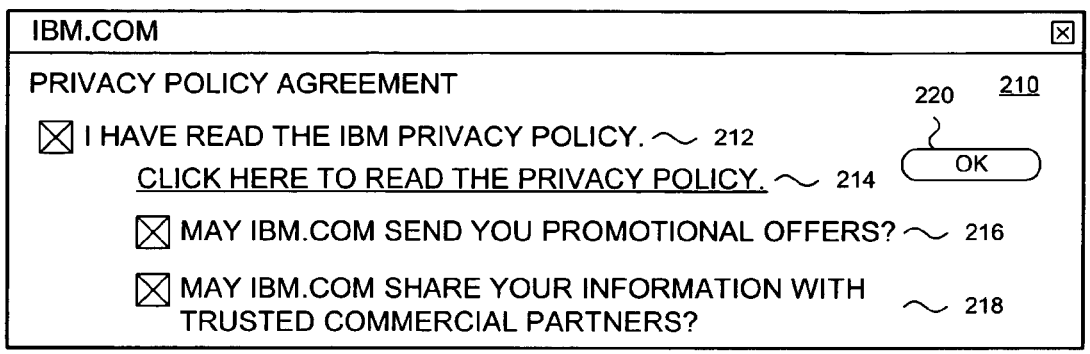
FIG. 2B depicts a typical graphical user interface window for obtaining user consent and user preferences with respect to a privacy policy that is presented by an enterprise with respect to management of personally identifiable information for a user.
Figure 2C:
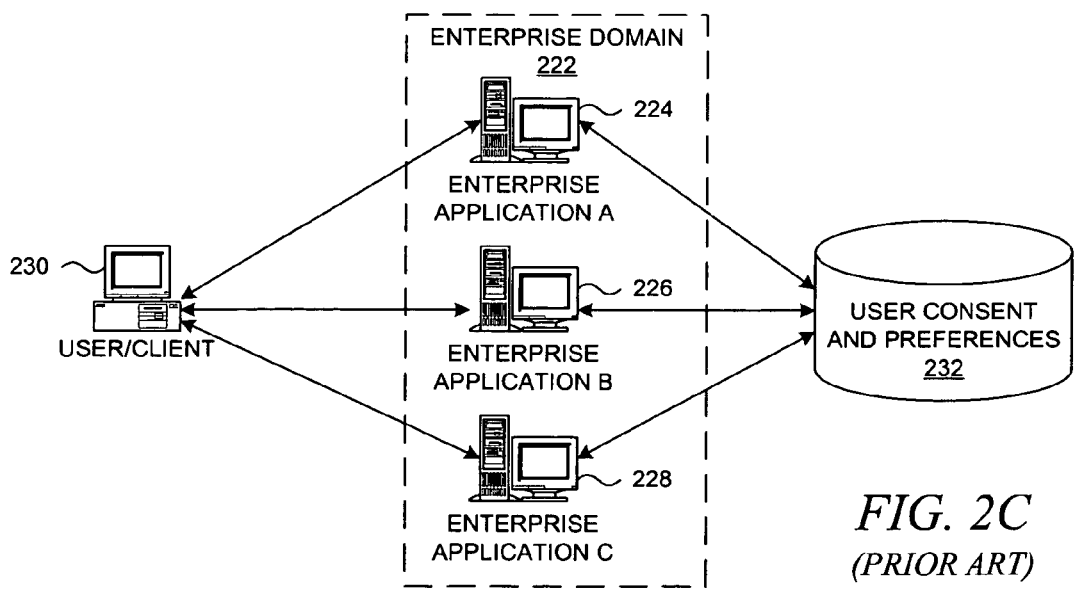
FIG. 2C depicts a block diagram that shows a typical process in which multiple applications within an enterprise domain are responsible for enforcing privacy promises to a user and subsequently applying the user's consent to a privacy policy along with the user's preferences with respect to handling the user's personally identifiable information.

In contrast to the independent privacy policy functionality that is exhibited by applications 224-228 that are shown in FIG. 2C, privacy proxy 312 acts as a single point of implementation and administration of the required privacy functionality. Although privacy proxy 312 may be implemented as a stand-alone server or as a stand-alone application, privacy proxy 312 may be implemented as one or more components within another server, application, servlet, plug-in, or other type of component such that the privacy proxying functionality is implemented as an intermediate privacy proxying agent between user/client 310 and applications 304-308.

After user/client 310 attempts to access one of applications 304-308 via request 314, an application may attempt to write or read personally identifiable information from or to a variety of datastores, entities, or locations. Rather than allowing applications 304-308 to implement privacy functionality individually and separately, or rather than assuming that these applications are properly implementing privacy functionality, privacy proxy 312 intervenes in the data flow in accordance with configuration parameters within privacy proxy configuration database 316. Privacy proxy 312 checks the privacy policy along with the user consent data and the user preference data within user profile database 318 with respect to the attempted operation on the personally identifiable information. If the attempted access or the handling of the personally identifiable information adheres to the privacy policy and the user's consent and preferences with respect to the privacy policy, an application would then be allowed to continue its operations with respect to the personally identifiable information, as explained in more detail hereinbelow, e.g., such as sending a response 320 to request 314.

Figure 3B:
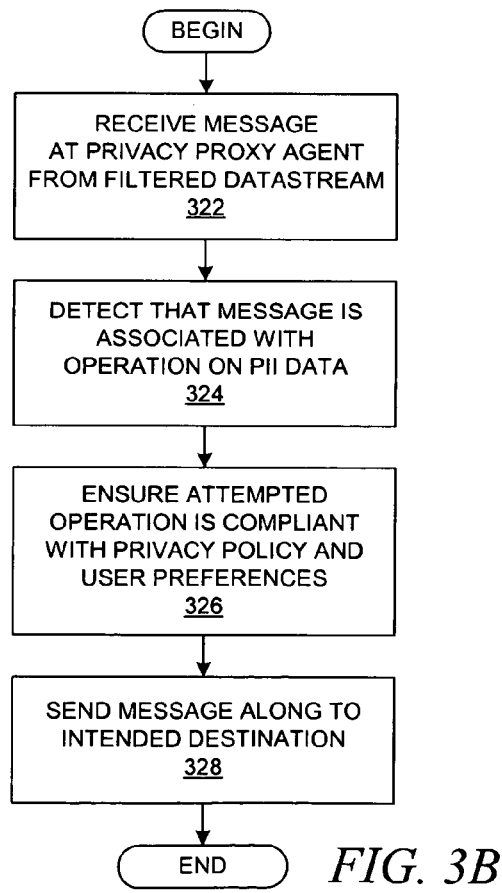
FIG. 3B depicts a flowchart that illustrates an overview of a process in which a privacy proxying agent filters messages with respect to privacy functionality to ensure consistent privacy policy enforcement in accordance with an embodiment of the present invention.

With reference now to FIG. 3B, a flowchart depicts an overview of a process in which a privacy proxying agent filters messages with respect to privacy functionality to ensure consistent privacy policy enforcement in accordance with an embodiment of the present invention. The process commences when a privacy proxying agent receives a message within a filtered incoming datastream or within a filtered outgoing datastream (step 322). The privacy proxying agent detects that the message is associated with an operation on a user's personally identifiable information (step 324), and in response, the privacy proxying agent ensures that the attempted operation is compliant with a privacy policy and the user's previously specified preferences with respect to that privacy policy (step 326). The privacy proxying agent then sends the message along to its intended destination (step 328), e.g., by re-inserting the message into the appropriate datastream. The process that is shown as an overview in FIG. 3B is shown in more detail in FIG. 4.

Figure 4:
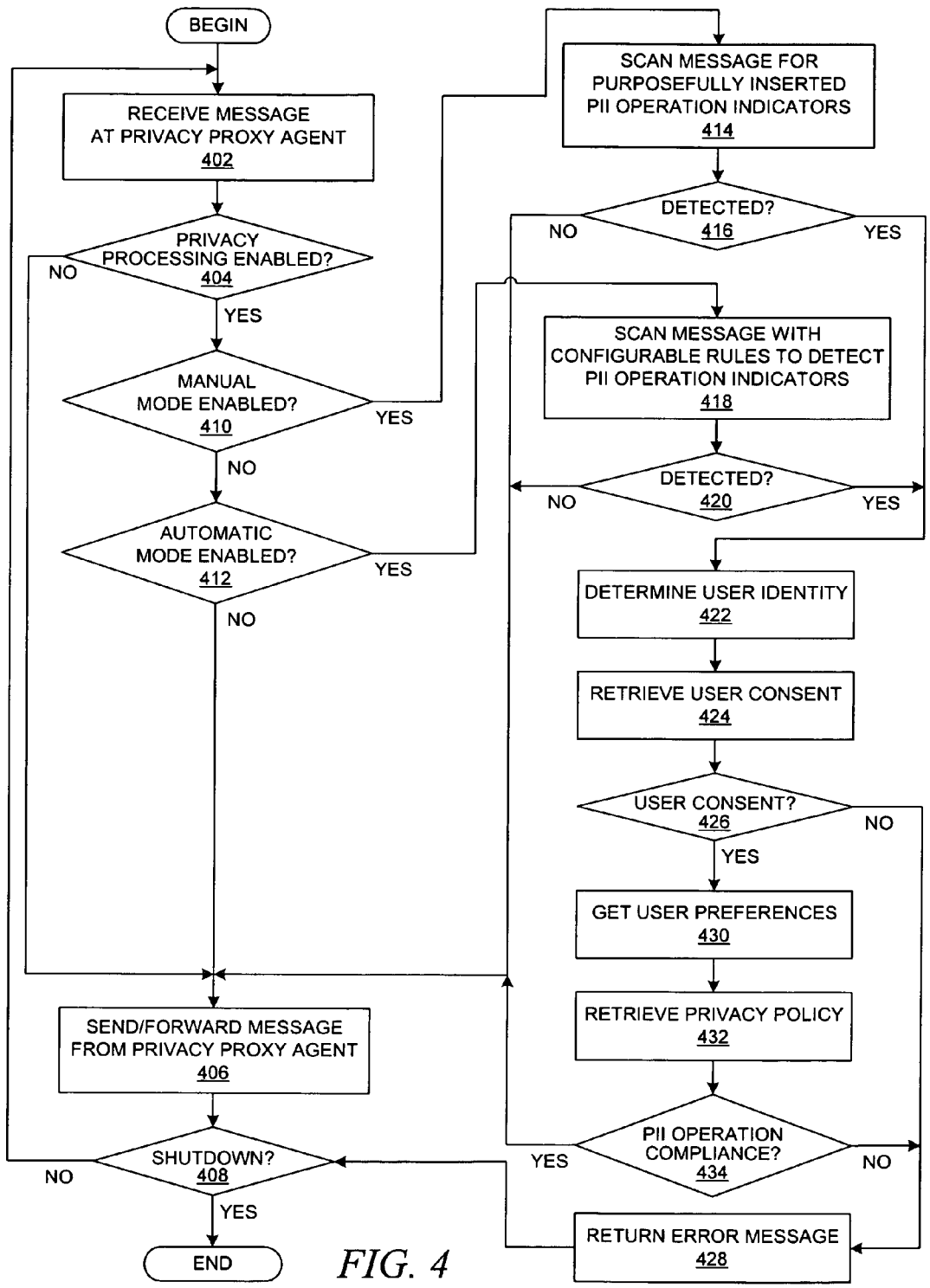
FIG. 4 depicts a flowchart that illustrates a detailed process in which a privacy proxying agent filters messages with respect to privacy functionality to ensure consistent privacy policy enforcement in accordance with an embodiment of the present invention.

With reference now to FIG. 4, a flowchart depicts a detailed process in which a privacy proxying agent filters messages with respect to privacy functionality to ensure consistent privacy policy enforcement in accordance with an embodiment of the present invention. The process commences when the privacy proxying agent receives a message from an application (step 402). In the example that is shown in FIG. 4, the privacy proxy may filter an incoming datastream/datapath and/or an outgoing datastream/datapath. The privacy proxying agent filters outgoing or incoming datastreams by examining and/or analyzing the content of the outgoing or incoming messages, respectively. For example, the received message may be obtained from an outgoing datastream, such as an HTTP message with a content body that contains an HTML document that represents a web page; the message may be a response message from a server to a client in response to a previous request from the client to access a resource that is controlled by the server or within an enterprise domain.

It should be noted that the privacy proxying agent may operate within a series of proxy agents that perform different functions for an enterprise domain. For example, a first proxy agent retrieves a message from the incoming datastream, analyzes the message, performs an operation with respect to the message, and then places the message back into the incoming datastream, after which it is retrieved by a second proxy agent that performs an operation that is either dependent or independent upon the operation of the first proxy agent. The message may undergo a series of operations prior to being received at its intended destination.

After obtaining the message, the privacy proxying agent determines whether privacy processing has been enabled (step 404), e.g., via a configuration flag that has been set in response to a selection or a configuration by an administrative user, possibly through an administrative utility application, and then stored within a privacy proxy configuration file, parameter file, properties file, environment variables file, or similar datastore; the privacy processing enablement flag allows an administrative user to turn on and off the privacy proxying functionality as deemed necessary. Other additional configuration options may be selectable by an administrative user, as mentioned hereinbelow.

If the privacy proxying agent determines at step 404 that privacy functionality is not currently enabled, then the privacy policy enforcement functionality does not need to be executed, and the process branches to continue handling the message. The privacy proxying agent sends or forwards the message (step 406), e.g., from the privacy proxying agent to its intended destination, such as a user/client agent for an outgoing message or an application server for an incoming message. Alternatively, the privacy proxying agent may simply send the message by re-inserting the message into the appropriate datastream; as noted above, the sending or forwarding operation may include re-inserting the message into the incoming or outgoing datastream or datapath such that another proxying agent may process the message. In some cases, the transmitted message may be the original message that was received at the privacy proxying agent, i.e. the message has not been modified by the privacy proxying agent, although in some cases, the privacy proxying agent may have modified the message. Step 406 may also be reached through processing branches at other steps within the flowchart as described further below.

The privacy proxying functionality acts within an asynchronous event loop whereby it continues to filter messages as received until the privacy proxying agent is terminated, as represented by a processing step in which the privacy proxying agent determines whether or not it should shutdown (step 408); if not, then the privacy proxying agent branches back to step 402 to continue filtering the datastreams. If the privacy proxying agent determines at step 408 that it should be terminated, then the process is concluded.

The remainder of the process that is illustrated within the flowchart in FIG. 4 is directed to detecting whether the received message is somehow involved in the processing of personally identifiable information, and if so, whether the operation that is associated with the received message complies with a privacy policy and the user's consent and the user's preferences with respect to that privacy policy.

The processing of personally identifiable information may be performed in a variety of scenarios, and the privacy proxying agent is configured to detect these scenarios. For example, the received message may be associated with a write operation that involves personally identifiable information, or the received message may be associated with a read operation that involves personally identifiable information. For a write operation, the received message contains personally identifiable information that is being transmitted to some location or datastore, e.g., which may occur when a client is sending data to an application server or when an application server is sending the personally identifiable information to a different application server, either within a given domain or outside of the given domain. For a read operation, the received message may be involved in an attempt to obtain personally identifiable information, e.g., which may occur when an application server is sending a read request to a datastore or when an application server is sending an HTML form to a client device to obtain data input directly from a user. For any of these scenarios, the privacy proxying agent has the ability to detect, via the received message, that an operation is being performed with respect to personally identifiable information. After determining that the received message is somehow involved in the processing of personally identifiable information, the privacy proxying agent determines whether the operation that is associated with the received message complies both with a privacy policy and also with the user's consent and preferences with respect to that privacy policy.

The privacy policy enforcement functionality may be performed using two different modes of operation. After determining at step 404 that the privacy policy enforcement functionality has been generally enabled, the privacy proxying agent determines whether a manual mode of privacy policy enforcement functionality has been enabled (step 410), e.g., via a configuration flag that has been set in response to a selection of an option by an administrative user. If a manual mode of privacy policy enforcement functionality has been enabled, then the process branches to filter or scan the received message in accordance with the manual mode of privacy policy enforcement functionality, as described in more detail hereinbelow.

If the privacy proxying agent determines at step 410 that a manual mode of privacy policy enforcement functionality has not been enabled, then the privacy proxying agent determines whether an automatic mode of privacy policy enforcement functionality has been enabled (step 412), e.g., via a configuration flag that has been set in response to a selection of an option by an administrative user. If so, then the process branches to filter or scan the received message in accordance with the automatic mode of privacy policy enforcement functionality, as described in more detail hereinbelow.

If neither the manual mode of operation nor the automatic mode of operation is detected, then the privacy proxying agent may simply continue at step 406 without performing any further privacy proxying functionality.

If the privacy proxying agent determines at step 410 that a manual mode of privacy policy enforcement functionality has been enabled, then the privacy proxying agent scans the received message for at least one purposefully inserted indicator that indicates an attempt to process personally identifiable information in some manner with the received message (step 414). In other words, the received message contains an indicating data element that specifically alerts the privacy proxying agent that the received message is associated with the processing of personally identifiable information. In this mode of operation, the originating application and the privacy proxying agent cooperatively act to ensure that the received message and its associated PII-related operation are in compliance with a privacy policy and the user's consent and preferences with respect to the privacy policy.

If a purposefully inserted indicator is detected within the received message (step 416), then the process branches to continue the privacy policy enforcement functionality, as discussed in more detail hereinbelow. If a purposefully inserted indicator is not detected within the received message, then the process branches to step 406 to send or forward the message from the privacy proxying agent.

The type or the formatting of the purposefully inserted indicator may vary in different implementations or among different applications. In addition, the privacy proxying agent may be configured through parameters in a privacy proxy configuration datastore, such as datastore 316 in FIG. 3A, to recognize different purposefully inserted indicators. For example, the privacy proxying agent may be configured to look for a custom meta-tag or a pair of custom meta-tags within the content portion of a received message; if a pair of meta-tags, e.g., "<PII>" and "</PII>" or "<Privacy>" and "</Privacy>", are embedded within an HTML document or an XML document, then the portion of the document between the meta-tags would provide information to the privacy proxying agent about the manner in which the received message should be processed with respect to the enterprise's privacy policy and/or a user's specified privacy preferences. A custom meta-tag or a pair of custom meta-tags may have associated attributes or parameter values in a manner that is well-known for markup languages. In a more simple embodiment, a single meta-tag without additional parametric information may act as a triggering signal from an application to the privacy proxying agent to conduct privacy policy enforcement functionality with respect to the received message. It should be noted that the scanning operation by the privacy proxying agent is not necessarily limited to analysis of text content within the received message; depending on the format of the received message and the format of the content within the received message, various binary data content may also be analyzed by the privacy proxying agent. It should also be noted that the privacy proxying agent may modify the received message to remove the meta-tags or other type of purposefully inserted indicators; in other embodiments, the privacy proxying agent may not remove the purposefully inserted indicators; e.g., a browser application at a client that does not recognize the custom meta-tags would ignore any tags and associated elements that is does not recognize when processing a markup language document.

If the privacy proxying agent determines at step 412 that an automatic mode of privacy policy enforcement functionality has been enabled, then the privacy proxying agent scans the received message for indications of an operation to process personally identifiable information in some manner that involves the received message (step 418), which does not contain a purposefully inserted indicator. In this mode of operation, the application that originated the received message has not provided an indicating data element within the received message, which contrasts with the manual mode of operation that is described above with respect to steps 414 and 416. In other words, the originating application has not placed within the received message at least one purposefully inserted indicating data element that would specifically alert the privacy proxying agent that the received message is involved in the processing of personally identifiable information.

Hence, the received message may contain either personally identifiable information or other content that attempts to obtain personally identifiable information from the user, but the received message does not contain a purposefully inserted indicating data element that would trigger the privacy proxying agent to be aware of this fact. In this scenario, the privacy proxying agent acts independently of the originating application to ascertain whether or not the received message is involved with a reading, writing, or similar operation on personally identifiable information. In this mode of operation, the originating application does not require any modifications to interoperate with the privacy proxying agent; the privacy proxying agent can be implemented as part of the front-end interface or middleware of the enterprise domain, thereby limiting or eliminating any modifications to the back-end applications.

If the privacy proxying agent detects indications within the received message of an operation to process personally identifiable information in some manner that involves the received message (step 420), then the process branches to continue the privacy policy enforcement functionality, as discussed in more detail hereinbelow. If the privacy proxying agent does not detect indications within the received message of an operation to process personally identifiable information, then the process branches to step 406 to send or forward the received message from the privacy proxying agent.

The privacy proxying agent may be implemented in a variety of manners to perform the automatic mode of privacy policy enforcement functionality. For example, the privacy proxying agent may be configured to obtain pre-configured rules that have been selected or configured by an administrative user and then stored within a configuration datastore; the rules could be tailored by an administrative user with respect to the known capabilities of the back-end applications that might attempt to process personally identifiable information. These rules may exist in the form of regular expressions, and these regular expressions can be evaluated against the content of the received message. A rules engine within the privacy proxying agent evaluates the retrieved rules one-by-one in order to determine if the received message matches a condition that is specified by a rule. The rules may contain variables that represent various text strings that might be found within a document that is carried as content in the received message; in another example, the rules may contain variables that represent various control elements, such as check boxes or text entry field labels, that might be found within a form document that is carried as content within the received message. If the result of the evaluation of the expression is a boolean "true" value or some other type of positive result, then the content of the received message is determined to have satisfied the conditions that are represented within the rules, and the privacy proxying agent determines that the received message has triggered the continuation of the privacy policy enforcement functionality; in other words, the privacy proxying agent determines that the received message contains content that indicates an operation on personally identifiable information.

For example, the privacy proxying agent might evaluate rules that look for common types of data elements that are often used by applications when attempting to collect personally identifiable information. A markup-language-formatted form document that contains text entry field labels that contain the words "Name", "Telephone", and "Email address" might satisfy one rule; another rule might look for a combination of words that might be used within a simple text document that represents a printable form, such as "Name", "Address", and "Required Field" or "Required Information".

If the privacy proxying agent detects a purposefully inserted indicator within the received message during the manual mode of operation, or if the privacy proxying agent detects content that attempts to process personally identifiable information during the automatic mode of operation, then the privacy policy enforcement functionality continues by determining the identity of the user that is associated with the personally identifiable information that is being manipulated or processed via the received message (step 422). For example, the received message may be processed within the context of a user session, and the user identity that is associated with the session may be retrieved from a data structure that is accessible to the privacy proxying agent. Alternatively, the received message may contain information that provides the user identity.

After obtaining the user identity in one of these manners or in some other manner, the privacy proxying agent employs that user identity to retrieve a data value that represents a user consent response by that particular user towards a privacy policy (step 424). A check is made as to whether the user has consented to the privacy policy (step 426), and if so, then the privacy proxying agent continues to execute the privacy policy enforcement functionality. If the user has not previously consented to the privacy policy, then an error message of some kind is returned as a response to the received message (step 428), e.g., to the originator of the received message, and the processing of the privacy policy enforcement functionality is concluded because the user has previously declined the conditions that were stated within at an enterprise privacy policy, and the enterprise should not perform any operations with respect to the user's personally identifiable information without the user's permission; the format of the error message may be configurable, and/or the manner in which the attempted operation is failed may be configurable.

The user's consent or declination with respect to the privacy policy may have been previously obtained in a variety of manners. For example, at some previous point in time, the privacy proxy agent or some other entity within the enterprise has sent a privacy policy consent document or form to the user agent. The privacy policy consent form minimally contained some manner for obtaining an indication from the client that the user has or has not consented to a privacy policy of the enterprise by requiring a particular computational selection operation by the user; e.g., a privacy policy consent form might have had an "I Accept" push-button and an "I Decline" push-button within a document that was presented to the user by a user agent application at the client. The privacy policy may have been sent along with the privacy policy consent document, or the privacy policy consent document might have contained a manner for allowing the user to view the privacy policy, e.g., by selection of a hyperlink within the privacy policy consent document, which would have caused the user agent at the client to retrieve a privacy policy document that contains the privacy policy as its content. In any case, the privacy proxying agent has received a response from the client, and the privacy proxying agent has analyzed the response to determine whether it contained the user's consent to (or declination of) the privacy policy. If the user agreed to the privacy policy, then the privacy proxying agent stored a data indicator of the user's consent; if the user declined to agree to the privacy policy, then the privacy proxying agent stored a data indicator of the user's declination. The privacy proxying agent would have stored the user's consent by storing an indicating value in association with the user's identity in some manner, e.g., within the user's profile or some other user-specific account information; storage of this information allows the consent indicator to be retrieved at some later point in time when the privacy proxying agent again needs to determine whether the user has previously provided the user's consent to the privacy policy that controls the management of the collected user-specific personally identifiable information, e.g., when the privacy proxying agent again executes steps 424 and 426.

Thus, the determination of whether the user has previously consented to the privacy policy may be performed in a variety of manners. For example, the received message may be associated with a particular active session within the enterprise domain, which might be indicated by an associated session identifier that accompanies transactions that are performed within the enterprise domain in response to requests from the client. Hence, the received message may have an associated session identifier, and the data structures that support the identified session may contain information that relates the active session to a particular user. In one embodiment, a session-specific data structure may store an indication of whether or not the user has previously consented to the enterprise's privacy policy. In another embodiment, it may be assumed that the user has previously completed an authentication operation such that the identity of the user has been verified, and a copy of the authentication credentials may be stored in a session-specific data structure, wherein the authentication credentials include a user identifier; hence, a session-specific data structure provides a mechanism for relating a session identifier to a user identifier, which may then be used to perform a lookup operation within a datastore that contains a user profile for the identified user, which would include an indication of whether or not the user has previously consented to the enterprise's privacy policy.

After determining at step 426 that the user has consented to the privacy policy, the privacy proxying agent then obtains the user preference data for the same user (step 430). When the enterprise collected the user consent to (or declination of) a privacy policy, the enterprise collected additional privacy policy preferences; these user preferences are determined by the enterprise with respect to the enterprise's management of any personally identifiable information for the user that is collected by the enterprise. If the enterprise has requested that the user provide these preferences at the same time that the enterprise requests the user's consent, e.g., through the use of check boxes, etc., within a form document, then these preferences may have been returned in the same response with the user's consent. In a manner similar to that described above with respect to the data value that indicates the user's consent or declination of the privacy policy, the privacy proxying agent has obtained and stored the user preference data as appropriate data in association with the user's identity in some manner, e.g., within the user's profile or some other user-specific account information.

After obtaining the user preference data, the appropriate privacy policy is retrieved (step 432). The privacy proxying agent may support the use of multiple privacy policies. For example, different groups of users may be required to consent to different privacy policies. Alternatively, an enterprise's privacy policies may change over time, and until an enterprise gets the consent of a user to a newly implemented privacy policy, the enterprise may continue to apply an older privacy policy to any operations on the user's personally identifiable information.

The privacy proxying agent then determines whether the operation on the user's personally identifiable information is compliant with the appropriate privacy policy and the previously specified user preference data with respect to that privacy policy (step 434). The user preference information guides the enterprise in determining the operations that are allowable with respect to the user's personally identifiable information, thereby providing flexibility to the enterprise in the manner in which different users prefer to allow certain operations with respect to personally identifiable information. If the operation on the personally identifiable information is compliant with the privacy policy and the user preference data, then the privacy proxying agent allows the operation on the personally identifiable information to continue to execute; e.g., the process branches to step 406 to send or forward the received message from the privacy proxying agent to the appropriate entity that acts on the message, thereby performing some type of processing on the user's personally identifiable information. In this manner, the privacy proxying agent can restart the temporarily suspended transaction in which an application was attempting to perform some type of operation on the user's personally identifiable information.

If the operation on the personally identifiable information is not compliant with the privacy policy or with the user preference data with respect to the privacy policy, then the privacy proxying agent does not allow the operation on the personally identifiable information to continue to execute; e.g., the process branches to step 428 so that an error message of some kind is returned as a response to the received message, e.g., to the originator of the received message. If the attempted operation on the user's personally identifiable information is not compliant with the privacy policy and/or the user's preferences with respect to the privacy policy, then the applications within the enterprise domain should not perform the attempted operation on the user's personally identifiable information; the privacy proxying agent fails the previously suspended transaction in some manner, e.g., by returning some type of error message to the application that originated the message.

The manner in which the privacy proxying agent notifies an application of a failure may be configurable by an administrative user. In a manual mode of operation, the application has some logic such that it acknowledges the presence of the privacy proxying agent by providing the purposefully inserted indicator within the received message for indicating the intention to perform an operation on the user's personally identifiable information; in a similar manner, the application might have logic that allows it to accept error messages specifically from a privacy proxying agent. In this case, the privacy proxying agent may return a specific error message that informs the application that the privacy proxying agent has determined that the operation does not comply with the privacy policy and/or the user's preference information with respect to the privacy policy, thereby informing the application that it should perform some type of cleanup operations with respect to the attempted operation and/or perform some other type of appropriate action.

In an automatic mode of operation, the application might not be aware of the presence of the privacy proxying agent; the privacy proxying agent operates independently from the application. In this case, the privacy proxying agent needs to return a message to the application that would be expected by the application as if the message were received by the application directly from the user agent/client, i.e. as if the privacy proxying agent were not acting as an intermediate agent between the application and the user agent/client. Hence, the privacy proxying agent might generate a message that is appropriate for the received message. For example, an outgoing message may have provided a "Cancel" button within a form, wherein the "Cancel" button allows a user to cancel the current transaction at the application; in this case, the privacy proxying agent might generate a message, e.g., an HTTP POST message, that contains data as if the user has selected the "Cancel" button, and the application would perform an appropriate cleanup operation after receiving this type of message. The privacy proxying agent would determine the manner in which to generate the transaction cancellation in accordance with configurable parameters.

Figure 5:
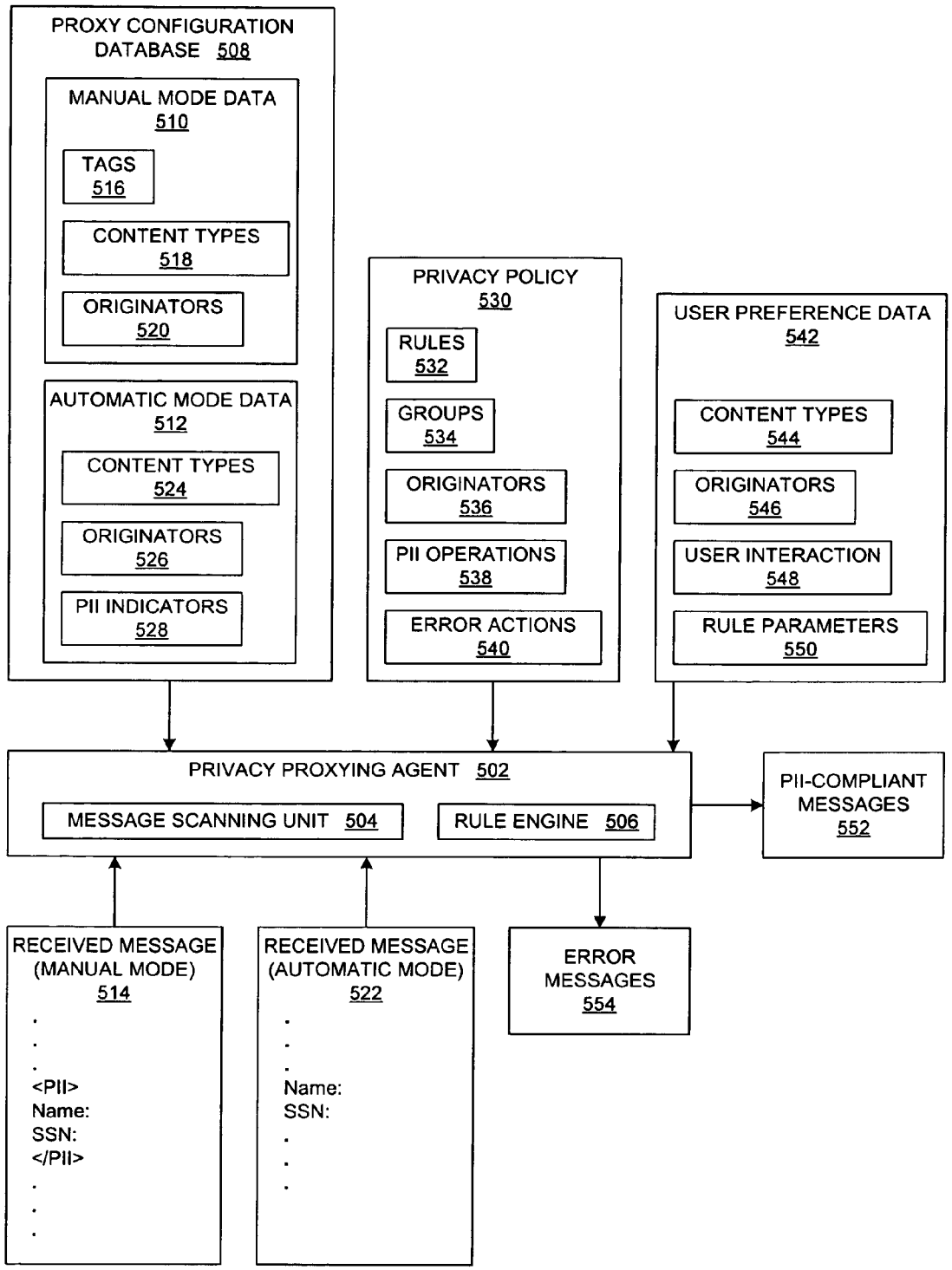
FIG. 5 depicts a block diagram that illustrates some of the inputs and outputs to a privacy proxying agent in accordance with an implementation of the present invention.

With reference now to FIG. 5, a block diagram depicts some of the inputs and outputs to a privacy proxying agent in accordance with an implementation of the present invention. Privacy proxying agent 502 employs message scanning unit 504 to scan messages within incoming and outgoing datastreams to determine whether the messages contain personally identifiable information. Privacy proxying agent 502 employs rule engine 506 to determine whether a message adheres to a privacy policy and user preferences with respect to the privacy policy.

Privacy proxying agent 502 uses proxy configuration database 508 to obtain configuration parameters that guide privacy proxying agent 502 in scanning a given message; manual mode data 510 includes parameters for scanning a message in manual mode, and automatic mode data 512 includes parameters for scanning a message in automatic mode. For example, privacy proxying agent 502 may scan received message 514 in manual mode. Tag data 516 in manual mode data 510 informs privacy proxying agent 502 as to the format or the content of the tags that would appear in received message 514 if received message 514 contains personally identifiable information, such as tags "<PII>" and "</PII>" that surround a name identifier and a social security number within received message 514. Content types data 518 in manual mode data 510 includes parameters for informing privacy proxying agent 502 about the types of content, e.g., message content types, that should be scanned by privacy proxying agent 502 while scanning messages in manual mode; e.g., certain types of documents or message content may not need to be scanned for personally identifiable information. Originator data 520 in manual mode data 510 includes parameters for informing privacy proxying agent 502 about the originators of messages that should be scanned by privacy proxying agent 502 while scanning messages in manual mode; e.g., certain messages may not need to be scanned for personally identifiable information when the messages have originated from certain applications because those applications may never process personally identifiable information.

With respect to automatic mode data 512 in proxy configuration database 508, privacy proxying agent 502 may scan received message 522 in automatic mode. Content types data 524 in automatic mode data 512 includes parameters for informing privacy proxying agent 502 about the types of content, i.e., message content types, that should be scanned by privacy proxying agent 502 while scanning messages in automatic mode; e.g., certain types of documents or message content may not need to be scanned for personally identifiable information. Originator data 526 in automatic mode data 512 includes parameters for informing privacy proxying agent 502 about the originators of messages that should be scanned by privacy proxying agent 502 while scanning messages in automatic mode; e.g., certain messages may not need to be scanned for personally identifiable information when the messages have originated from certain applications because those applications may never process personally identifiable information. PII indicator data 528 in automatic mode data 512 informs privacy proxying agent 502 about the format of personally identifiable information that might appear within the message content of the messages that are being scanned in automatic mode; e.g., message 522 contains the text strings "Name:" and "SSN:", which indicate the presence of a name identifier or a social security number within the message or an attempt to obtain such personally identifiable information.

After scanning a received message in either manual mode or automatic mode, privacy proxying agent 502 employs privacy policy 530 to determine whether a message that contains personally identifiable information or that is attempting to obtain personally identifiable information adheres to a privacy policy. Rules data 532 provides the rules, e.g., as logical expressions, that are to be applied against such messages. Group data 534 indicates the group of users for which privacy policy 530 is applicable; different privacy policies might be applied to different groups of users. Content types data 536 includes parameters for informing privacy proxying agent 502 about the types of content, i.e., message content types, for which privacy policy 530 is applicable; a privacy policy might be applied against different types of message content in different ways that depend on the message content. Originator data 536 includes parameters for informing privacy proxying agent 502 about the originators of messages for which privacy policy 530 is applicable; a privacy policy might be applied against different originators of messages in different ways that depend on the message originator. PII operations data 538 includes information for informing privacy proxying agent 502 about the types of PII processing for which privacy policy 530 is applicable. Error action information 540 informs privacy proxying agent 502 about the manner in which to provide an error indication to an originator of a received message if the received message does not comply with a privacy policy.

After scanning a received message in either manual mode or automatic mode, privacy proxying agent 502 also employs user preference data 542 to determine whether a message that contains personally identifiable information or that is attempting to obtain personally identifiable information adheres to a privacy policy and a user's specified preferences with respect to the privacy policy. Content types data 544 includes parameters for informing privacy proxying agent 502 about the types of content, i.e., message content types, for which user preference data 542 is applicable; a user may have specified a particular set of processing options that are applicable only against certain types of message content, e.g., web forms. Originator data 546 includes parameters for informing privacy proxying agent 502 about the originators of messages for which user preference data 542 is applicable; a user may have specified a particular set of processing options that are applicable only against certain types of applications or originators of content, e.g., mail programs. User interaction data 548 informs privacy proxying agent 502 about the manner in which privacy proxying agent 502 should interact with a user when processing a message that contains personally identifiable information or that is attempting to obtain personally identifiable information, e.g., by prompting the user in each instance that privacy proxying agent 502 determines that personally identifiable information is being transmitted or retrieved. Rule parameters 550 may include various parameters that are used as input to rule engine 506 to ensure that rules are evaluated properly with respect to the user's preference data.

If privacy proxying agent 502 determines that a received message is compliant with the requirements to handle personally identifiable information in accordance with a privacy policy and the user's preference with respect to the privacy policy, then privacy proxying agent 502 sends or forwards the received message as a PII-compliant message 552. If privacy proxying agent 502 determines that a received message is not compliant with the requirements of a privacy policy and the user's preference with respect to the privacy policy, then privacy proxying agent 502 sends or forwards the received message as a PII-compliant message 554.

The advantages of the present invention should be apparent in view of the detailed description that is provided above. It was noted above that there was a need for a method and system for implementing coherent, enterprise-wide, functionality for privacy policy enforcement. The present invention is directed to an improved data processing system that is extended to centralize enforcement of privacy policy rules in accordance with previously specified user consent and user preferences through the use of a privacy proxy that acts on behalf of multiple applications within an enterprise. The privacy proxy of the present invention provides a single point of implementation and administration of functionality for privacy policy enforcement. The privacy proxy also ensures consistency in the enforcement of a privacy policy, no matter which application within the enterprise's services attempts to access a user's personally identifiable information. In addition, the present invention lowers application development and maintenance costs.

It is important to note that while the present invention has been described in the context of a fully functioning data processing system, those of ordinary skill in the art will appreciate that the processes associated with the present invention are capable of being distributed in the form of instructions in a computer readable medium and a variety of other forms. Examples of computer readable media include media such as EPROM, ROM, tape, paper, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing data in accordance with a privacy policy within a data processing system, the method comprising:

receiving, at a proxy, a first message from a first system to a second system;

in response to a determination at the proxy that the first message is associated with an operation on personally identifiable information, determining at the proxy whether the operation on the personally identifiable information is compliant with a privacy policy and with user preference information with respect to the privacy policy for a user who is associated with the personally identifiable information, where the personally identifiable information is information that can uniquely identify an individual;

in response to a determination that the operation on the personally identifiable information is compliant with a privacy policy and with user preference information with respect to the privacy policy, sending the first message from the proxy to the second system; and in response to a determination that the operation on the personally identifiable information is not compliant with a privacy policy and with user preference information with respect to the privacy policy, sending a second message from the proxy to the first system, wherein the second message indicates an error status.

2. The method of claim 1 further comprising:

in response to a determination at the proxy that the first message is not associated with an operation on personally identifiable information, sending the first message from the proxy to the second system.

3. The method of claim 1 further comprising:

determining at the proxy whether the first message is associated with an operation on personally identifiable information by identifying personally identifiable information within the first message.

4. The method of claim 1 further comprising:

determining at the proxy whether the first message is associated with an operation on personally identifiable information by identifying that the first message initiates collection of personally identifiable information by the first system or by the second system.

5. The method of claim 1 further comprising:

determining at the proxy whether the first message is associated with an operation on personally identifiable information by scanning the first message for a data element that has been inserted into the first message by the first system to signal to the proxy that the first message is associated with an operation on personally identifiable information.

6. The method of claim 1 further comprising:

determining at the proxy that the first message is associated with an operation on personally identifiable information in accordance with a set of configurable rules that contain conditions that are evaluated against the first message.

7. The method of claim 1 further comprising:

determining at the proxy that the operation on the personally identifiable information is compliant with a privacy policy in accordance with a set of configurable rules that contain conditions that are evaluated against the first message.

8. The method of claim 1 further comprising:

determining at the proxy that the operation on the personally identifiable information is compliant with user preference information with respect to the privacy policy in accordance with a set of configurable rules that contain conditions that are evaluated against the first message.

9. An apparatus for processing data in accordance with a privacy policy within a data processing system, the apparatus comprising:

a processor;

a data store that stores a set of program instruction means that, when executed by the processor comprise a proxy that performs a method comprising:

receiving, at the proxy, a first message from a first system to a second system;

in response to a determination that the first message is associated with an operation on personally identifiable information, determining whether the operation on the personally identifiable information is compliant with a privacy policy and with user preference information with respect to the privacy policy for a user who is associated with the personally identifiable information, where the personally identifiable information is information that can uniquely identify an individual; and in response to a determination that the operation on the personally identifiable information is compliant with a privacy policy and with user preference information with respect to the privacy policy, sending the first message from the proxy to the second system; and in response to a determination that the operation on the personally identifiable information is not compliant with a privacy policy and with user preference information with respect to the privacy policy, sending a second message from the proxy to the first system, wherein the second message indicates an error status.

10. The apparatus of claim 9 wherein the method further comprises:

in response to a determination that the first message is not associated with an operation on personally identifiable information, sending the first message from the proxy to the second system.

11. The apparatus of claim 9 wherein the method further comprises:

determining whether the first message is associated with an operation on personally identifiable information by identifying personally identifiable information within the first message.

12. The apparatus of claim 9 wherein the method further comprises:
determining whether the first message is associated with an operation on personally identifiable information by identifying that the first message initiates collection of personally identifiable information by the first system or by the second system.

13. The apparatus of claim 9 wherein the method further comprises:
determining whether the first message is associated with an operation on personally identifiable information by scanning the first message for a data element that has been inserted into the first message by the first system to signal to the proxy that the first message is associated with an operation on personally identifiable information.

14. The apparatus of claim 9 wherein the method further comprises:
determining that the first message is associated with an operation on personally identifiable information in accordance with a set of configurable rules that contain conditions that are evaluated against the first message.

15. The apparatus of claim 9 wherein the method further comprises:
determining that the operation on the personally identifiable information is compliant with a privacy policy in accordance with a set of configurable rules that contain conditions that are evaluated against the first message.

16. The apparatus of claim 9 wherein the method further comprises:
determining that the operation on the personally identifiable information is compliant with user preference information with respect to the privacy policy in accordance with a set of configurable rules that contain conditions that are evaluated against the first message.

17. A computer program product on a computer readable medium for processing data in accordance with a privacy policy within a data processing system, the computer program product holding computer program instructions which when executed by the data processing system comprise a proxy that performs a method comprising:
receiving, at a proxy, a first message from a first system to a second system;
in response to a determination that the first message is associated with an operation on personally identifiable information, determining whether the operation on the personally identifiable information is compliant with a privacy policy and with user preference information with respect to the privacy policy for a user who is associated with the personally identifiable information, where the personally identifiable information is information that can uniquely identify an individual;
in response to a determination that the operation on the personally identifiable information is compliant with a privacy policy and with user preference information with respect to the privacy policy, sending the first message from the proxy to the second system; and
in response to a determination that the operation on the personally identifiable information is not compliant with a privacy policy and with user preference information with respect to the privacy policy, sending a second message from the proxy to the first system, wherein the second message indicates an error status.

18. The computer program product of claim 17 wherein the method further comprises:
in response to a determination that the first message is not associated with an operation on personally identifiable information, sending the first message from the proxy to the second system.

19. The computer program product of claim 17 wherein the method further comprises:
determining whether the first message is associated with an operation on personally identifiable information by identifying personally identifiable information within the first message.

20. The computer program product of claim 17 wherein the method further comprises:
determining whether the first message is associated with an operation on personally identifiable information by identifying that the first message initiates collection of personally identifiable information by the first system or by the second system.

21. The computer program product of claim 17 wherein the method further comprises:
determining whether the first message is associated with an operation on personally identifiable information by scanning the first message for a data element that has been inserted into the first message by the first system to signal to the proxy that the first message is associated with an operation on personally identifiable information.

22. The computer program product of claim 17 wherein the method further comprises:
determining that the first message is associated with an operation on personally identifiable information in accordance with a set of configurable rules that contain conditions that are evaluated against the first message.

23. The computer program product of claim 17 wherein the method further comprises:
determining that the operation on the personally identifiable information is compliant with a privacy policy in accordance with a set of configurable rules that contain conditions that are evaluated against the first message.

24. The computer program product of claim 17 wherein the method further comprises:
determining that the operation on the personally identifiable information is compliant with user preference information with respect to the privacy policy in accordance with a set of configurable rules that contain conditions that are evaluated against the first message.

* * * * *